United States Patent [19]

Gneiding

[11] Patent Number: 4,467,828
[45] Date of Patent: Aug. 28, 1984

[54] FLUID REGULATOR

[75] Inventor: Donald R. Gneiding, Fullerton, Calif.

[73] Assignee: Dual Fuel Systems, Inc., Los Angeles, Calif.

[21] Appl. No.: 348,514

[22] Filed: Feb. 12, 1982

[51] Int. Cl.³ .............................................. F16K 17/34
[52] U.S. Cl. ............................ 137/484.4; 137/505.25; 137/614.2
[58] Field of Search ............... 137/484.4, 505.25, 498, 137/614.2

[56] References Cited

U.S. PATENT DOCUMENTS

| | | | |
|---|---|---|---|
| 2,748,797 | 6/1956 | Heizer | 137/614.2 X |
| 2,888,949 | 6/1959 | Evans | 137/505.25 |
| 3,032,054 | 5/1962 | Irwin | 137/484.4 X |
| 3,033,220 | 5/1962 | St. Clair | 137/614.2 X |
| 3,094,141 | 6/1963 | Maienhuecht | 137/505.25 |
| 3,387,622 | 6/1968 | Weinstein | 137/614.2 X |
| 3,799,189 | 3/1974 | Christianson | 137/505.25 X |
| 3,809,441 | 5/1974 | Klimek | 137/505.12 X |
| 3,890,999 | 6/1975 | Moskow | 137/505.25 |

FOREIGN PATENT DOCUMENTS 2910046  11/1979  Fed. Rep. of Germany ........................ 137/505.25

Primary Examiner—Harold W. Weakley
Attorney, Agent, or Firm—Christie, Parker & Hale

[57] ABSTRACT

A movable tube controls the flow of fluid from supply through a regulator to discharge in response to pressure acting on a piston in a control chamber at discharge and opposed by a spring in a spring chamber. When the discharge pressure reaches a prescribed, regulated value, the tube no longer moves. The pressure drop through the regulator occurs at the outer diameter of the tube; consequently, no area of the tube sees supply side pressure that would tend to displace the tube. On the discharge side, the tube extends into a necked passage between a control chamber and an exit port to aspirate fluid from the control chamber and compensate for loss of spring force due to spring relaxation. The tube also closes when there is a sudden loss of discharge side pressure. The tube closes on the supply side against an elastomeric seat carried by a removable plug. The spring chamber is between supply side and discharge side downstream of a seal for the tube, and any leakage past the seal goes to atmosphere through a vent. More than one inlet and exit port permits flexibility in connection.

6 Claims, 2 Drawing Figures

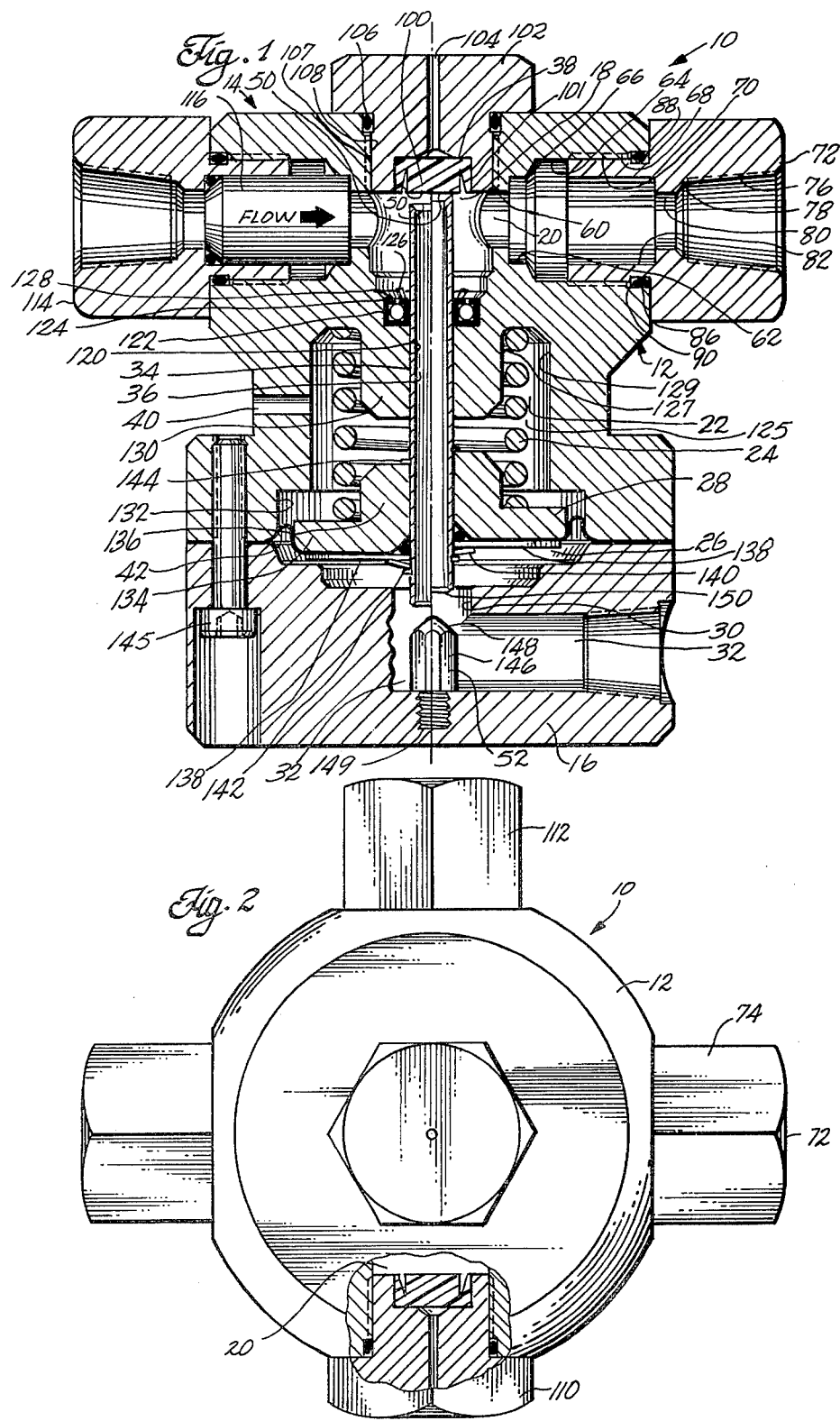

FLUID REGULATOR

BACKGROUND OF THE INVENTION

The present invention relates to fluid regulators. Fluid regulators are common devices utilized to reduce upstream pressure of a fluid to a lower downstream pressure compatible with use requirements. For example, gas may be stored at high pressure but can be usefully consumed only at low pressure, and regulators provide the pressure reduction. Fluid regulators employ a controlled valve element that admits to flow from a high pressure side to a low pressure side of the regulator. In one type of regulator, the valve element is controlled by surface areas acted upon by upstream and downstream pressure. A spring is commonly used to augment downstream pressure. When the downstream pressure is below regulated value, the valve element moves away from a seat in response to upstream pressure to permit increased flow. When the downstream pressure is sufficiently high and reaches the regulated value, the valve element maintains a fixed displacement from the seat. When the downstream pressure is higher than the regulated value, the downstream pressure forces the valve element close to the seat, restricting fluid flow. This type of system utilizes pressure differentials between upstream and downstream to effect a regulated constant downstream pressure. It is unsatisfactory in systems that have variable upstream pressure, for the lack of constancy of upstream pressure produces a variable downstream pressure.

A different type of regulator, a balanced regulator, produces regulation by a pressure differential between delivery pressure and some opposing fixed force source such as atmospheric pressure and a spring. When delivery pressure drops below a desired point, atmospheric pressure and the spring will urge a valve element further open to admit to the flow of more fluid. When the delivery pressure is at the desired level, it overcomes the effect of the atmospheric pressure and the spring moves the valve element further closed. The previous known types of balanced regulators have employed a valve element that is somewhat position-sensitive to supply side pressure.

A problem associated with regulation is that the force of a spring used to control orifice opening varies depending on the amount that the spring is stressed. This is a straightforward consequence of the well known fact that the force exerted by a spring is equal to a constant multiplied by the spring's displacement. When a spring is used to urge the valve towards an open position, as the valve opens the spring force drops slightly, resulting in the valve not opening in proportion to flow demand. This produces a lower than desired regulated pressure, an effect known as pressure droop. It is desirable to avoid this type of aberration because it affects the accuracy of regulation.

In the environment in which this invention evolved, natural gas stored in tanks is used as a fuel source for vehicles. The tanks are charged to some pressure, say 2400 p.s.i., and the gas from the tanks used in the limit to exhaustion, corresponding, say, to a pressure of 50 p.s.i. The gas experiences two stages of regulation. The first stage steps the pressure down from supply side pressure to some predetermined value, say 50 p.s.i. The second stage of regulation steps the pressure down from this value to a pressure compatible with introduction into a fuel-air mixer, typically a pressure of a few inches of water. The system is charged with high pressure natural gas through a check valve that admits to flow through it in a charging direction only.

Different vehicles use compressed natural gas. It is not possible, then, to have a general purpose layout of the various lines and hardware necessary to effect a compressed natural gas fueling system. It is therefore highly desirable to have the individual hardware components as adaptable as possible to the constrictions of different use environments.

Another problem that develops with the transport of some fluids is freezing of constituents upon expansion from high pressure to low pressure. Hydrates in natural gas, for example, can freeze and cause problems such as flow restrictions or even flow termination.

It is also highly desirable to have a regulator that is easily serviced, for example, one that can have its seals readily renewed, and to avoid fluid impingement on control surfaces that degrades the surfaces.

In such systems as a fuel system for vehicles it is obviously very desirable to close down the delivery system when there is a clandestine loss of pressure in order to avoid discharging the natural gas from the tanks.

SUMMARY OF THE INVENTION

The present invention provides an improved regulator to control the outlet pressure of a regulated fluid. In one of its aspects the present invention is characterized by the absence of effect of supply side pressure on the valve element of the regulator and the elimination of deleterious supply pressure effects on the performance of the regulator. Another aspect of the present invention contemplates a reduction in the pressure acting on a control element of the regulator to compensate for loss in spring force occasioned by spring relaxation during regulation. In its preferred form, the present invention effects a very simple and straightforward construction that is easily serviced and adaptable to placement in different restricted areas, such as in different vehicles.

In one form, the present invention contemplates a regulator having a body with at least one entrance port or passage that experiences supply pressure and at least one exit port or passage in the body is spaced from the entrance passage. A displaceable, pressure-sensitive control element, such as a piston, is mounted in the body and biased to oppose pressure applied to it by fluid in the exit passage. A tube secured to the pressure control element and extending through a bore has a passage to communicate the entrance passage with the exit passage. Seating means in the entrance passage is aligned with the tube. The tube is capable of seating on the seating means to close its entrance. Means seal the control element so that the exit pressure acts on only one side of the element.

The regulator permits fluid to flow through the tube from the entrance passage to the exit passage. When the pressure in the exit passage increases, as when there is substantial flow there, the pressure acts on the control element to move the piston and tube towards a closed position. As the pressure in the exit port increases, this tendency increases until closure occurs with the entrance of the tube against the seating means, an event corresponding to no demand.

Preferably, the tube in the entrance passage has no areas against which supply pressure can tend to move the tube. This is done by having the pressure drop across the regulator occur at the tube entrance and presenting no net tube area on the supply pressure side with a component normal to the direction of displacement of the tube. It is also preferred to have a control chamber on the discharge side of the regulator in communication with the exit passage through a necked passage with the piston sensing the pressure in the control chamber and the tube extending into the necked passage. With this arrangement, fluid discharging from the tube in the necked passage acts like a jet pump and aspirates fluid in the control chamber to lower the pressure there. A spring in a spring chamber acting on the control element in opposition to pressure in the control chamber relaxes slightly as the regulator opens to permit more fluid to pass. This relaxation tends to cause discharge pressure droop but with the aspirated control chamber, this tendency is either eliminated or attenuated, depending on the desired characteristics of the regulator.

In its presently preferred form, the regulator has as an entrance passage a valve chamber with at least two inlet ports opening into it. The seating means comprises a seal of resilient material mounted in a removable insert. The seal face opposite the valve chamber is vented so that the valve chamber pressure does not get behind the seal and extrude it or unseat it upon a lowering of valve chamber pressure. If desired, a spare insert with seal can be mounted on the body in one of the entrance ports. By having a multiplicity of entrance ports, regulator mounting and system plumbing to accommodate various constraints is made easy. This facility also admits to the use of a charge coupling and a check valve between the charge coupling and the valve chamber that permits flow only in the direction of the valve chamber. The valve chamber can then be used as a conduit for charging fluid into receptacles and the regulator as a body to mount the charge coupling. To facilitate the adaptability of the regulator to various mounting arrangements, it is also preferred to have at least two exit ports. A safety feature of the invention includes a seat in line with the exit end of the tube to partially seal the tube upon a sudden drop in exit pressure and concomitant displacement of the tube against the seat. The control element is a piston biased towards the control chamber by a spring, with a chamber receiving the spring and the control chamber separated by a diaphragm. The spring chamber is vented to atmosphere and is between the control chamber and the valve chamber. Any leakage along the tube from the valve chamber will then vent to atmosphere, and not go to the discharge side of the regulator. The body has a cover that mounts to a chambered section and clamps the diaphragm between it and the chambered section. The cover defines the control chambers, necked passage and exit port, and the chambered section defines the entrance ports, valve chamber and spring chamber.

These and other features, aspects and advantages of the present invention will become more apparent from the following description, appended claims and drawings.

BRIEF DESCRIPTION OF THE FIGURES

FIG. 1 is a view in elevational half section of the preferred regulator of the present invention showing the regulator control elements in an open position to the left of the center line of the view and in a closed position on the right, and with the section plane rotated 30° around the center line to illustrate the attachment of a body cover to the balance of the body; and FIG. 2 is a top plane view with a portion in section of the embodiment shown in FIG. 1.

DESCRIPTION OF THE PREFERRED EMBODIMENT

A regulator 10 has a body 12. The body has a chambered section 14 and a cover 16. A valve chamber 18 in the chambered section is in open communication with four radial passages 20. A spring chamber 22 receives a spring 24. A control chamber 26 in the upper portion of cover 16 faces a control element, piston 28. The control chamber opens through a necked passage 30 to exit ports 32. A flow control tube 34 attaches to piston 28 for movement with it. The tube has a passage 36 that can communicate valve chamber 18 with necked passage 30. A valve seat 38 in chamber 18 in line with entrance of tube 34 seals the tube off in a closed position of the regulator. Spring chamber 22 vents to atmosphere through a port 40. A diaphragm 42 between the cover and the chambered section and attached to the piston isolates fluid in the control chamber from the spring chamber.

Before proceding with detailed description a brief description of the operation of the embodiment thus far described will be presented.

Fluid will flow into valve chamber 18. During normal regulation, tube 34 will be off seat 38. Pressure regulation occurs by the tube moving closer to or further from the seat. If the pressure in control chamber 26 is above the desired regulated value, it is sufficiently high to overcome the effect of spring 24 and atmospheric pressure on the spring chamber side of piston 28 and move tube 34 toward seat 38. With a reduction in pressure in control chamber 26 below regulated value, spring 24 and atmospheric pressure in the spring chamber will force piston 28 and its carried tube 34 in the direction of the control chamber, further opening tube 34 to valve chamber 18 and permitting the flow of more fluid through the tube and into the exit passage. The exit of the tube is well within necked passage 30 and the discharge of fluid from the exit end of the tube will aspirate fluid from the control chamber, reducing the pressure there. With the reduction of pressure there, the piston will move, and the tube will move further in the direction of the control chamber. With that movement the regulator opens more. This effect compensates for loss of spring force due to spring relaxation upon opening.

An important feature of the present invention derives from the geometry of tube 34. The tube presents effectively no area to supply side pressure that would tend to displace the tube, even on the annulus at the entrance of the tube in the valve chamber. The tube has an interior chamfer 50 that extends out to the outer diameter of the tube to present a sharp, annular edge at the outer diameter. This assures that the pressure drop across the regulator will occur at the edge and no supply side pressure seeing the entrance end of the tube. When the tube is seated against valve seat 38, no pressure drop occurs, but no area of the tube is exposed to supply side pressure in a sense that would tend to move the tube because the seal is along the outer diameter of the tube. The result is a regulator that is capable of substantial pressure reduction without supply side pressure affecting regulation.

As previously mentioned, the tube's extension into necked passage 30 reduces the pressure in control chamber 26 and compensates for loss of spring force with spring extension. This eliminates pressure droop and results in a substantially flat regulated pressure.

Another aspect of the tube geometry is that it effects self-cleaning. Because of chamfer 50, any hydrates or icing resulting from expansion of gaseous fluid, such as natural gas, passes directly into the tube and does not have a tendency to clog the tube.

Another aspect of the geometry of the piston and tube arrangement of the regulator is the ability to effect a safety cutoff with the simple expedient of a vlave seat at the exit end of the tube. Such a seat is shown at 52 attached to cover 16 in line with the exit end of the tube. Upon the sudden reduction of pressure on the exit side of the regulator to some level below regulated discharge pressure, as when there is a break in a downstream line, the tube follows the piston and closes on seat 52 to seal the tube and prevent catastrophic loss of upstream fluid. If desired, a minute leak can be permitted past seat 52 to permit the exit side to re-pressurize and lift the tube from the seat once the cause of the loss of downstream pressure is fixed.

In greater detail, each of the inlet ports 20 into chambered section 12 is identical and there are four of them arrayed radially at 90° intervals. Beginning in the valve chamber and working radially outward, each inlet port 20 includes a short bore 60 that opens into a right cylindrical counterbore 62. That counterbore in turn opens into a larger bore 64, with bore 64 and counterbore 62 connected through a frusto-conical passage 66. A portion of bore 64 is internally threaded at 68 to receive external threads 70 of a fitting 72. The fitting has a hexagonal pattern of wrenching flats 74 and an internally threaded bore 76 to receive external threads of a complementary fitting in a standard manner. A seat 78 at the interior end of bore 76 meets a bore 80 that opens directly into an enlarged diameter passage 82 of the fitting. That passage in turn empties into bore 64. An O-ring groove 86 in the fitting receives an O-ring 88. A complementary groove 90 in the chamber body at the extreme radial end of bore 64 provides lands against which O-ring 88 can seal.

Seat 38 is generally a right cylindrical disk. It mounts in a cylindrical recess 101 of a plug 102. The seat has an annular channel 100 near its radial limit to present an annular lip responsive to valve chamber pressure to the cylindrical wall of recess 101. A relief passage 104 in the plug between atmosphere and the low pressure side of seat 38 prevents valve chamber pressure from reaching the low pressure side of the seat and popping or extruding the seat upon subsequent lowering of valve chamber pressure. An O-ring 106 between plug 102 and the body makes a seal there in the manner described with reference to fitting 72 and O-ring 88. Plug 102 has external threads 107 for receipt in a threaded bore 108 of the body.

As can be seen in FIG. 2, a square plug and valve seat assembly 110 may readily be provided, and it may be threaded into one of the radial passages. Its construction is identical to the construction of the valve seat and plug assembly of valve seat 38 and plug 102.

As can also be seen in FIG. 2, more than one inlet port fitting may be provided, such as at 112. If either fitting 74 or 112 is not desired it may be readily plugged with a standard plug inserted in threads of the fittings or the body threads for the inserts.

In the embodiment illustrated, a charge fitting 114, identical to fittings 72 and 112, threads into one of the inlet ports. A standard check valve 116 received by the fitting seats in enlarged bore 64 of the particular port that it is placed into. The check valve is of a standard poppet and spring construction and admits to flow only towards valve chamber 18. The regulator, then, can be used in the charging of upstream fluid tanks or containers, such as compressed natural gas tanks. An appropriate externally threaded fitting is threaded into the threads of fitting 114, and charging is effected through fitting 114, past check valve 116 into valve chamber 18 and upstream through one of the inlet ports, say the inlet port having fitting 72. Flow is prevented from going in the opposite direction by the check valve. Again, an appropriate O-ring seal between fitting 114 and the body is provided.

Tube 34 is received in an axial bore 120 in body section 12. A counterbore 122 opens into valve chamber 18 and receives a standard lip seal 124. That seal prevents the flow of fluid along the interface between the tube and the wall of the bore. An internal retaining ring 126 retains the lip seal in place. The retaining ring gains purchase on the walls of an enlarged counterbore 128 in body section 12.

Spring chamber 22 has an annular upper (with respect to the view in FIG. 1) portion 125 defined by an interior, axially extending annular wall 127 and an external, axially extending wall 129 of a guide section 130 of the body section. Spring 24 is received in the annulus, passes over a chamfered nose of the guide and bears against an annual radial wall at the top of the chamber. A couterbore 132 of a diameter larger than annulus 125 opens into the annulus and directly faces control chamber 26. Piston 28 has a head 134 of major diameter and a reduced diameter hub 136 that receives tube 34. Diaphragm 42 lies on head 134 on the control chamber side. A diaphragm retaining disk 138 between the diaphragm and control chamber 26 keeps the diaphragm in contact with the head. A spring washer 140 retains disk 138 in place by compressively bearing against it. The washer, in turn, is kept in place by an external locking ring 142. Locking ring 142 is received in an annular notch on the outside surface of the tube. The interior end of the disk is held in place by another external retaining ring 144, also received in a groove on the outside surface of the tube.

Cover 16 of body 12 secures to chambered section 14 through a plurality of screws 145, say six at 60° intervals, threaded into appropriately threaded bores in the chambered section, and having heads received in counterbores of the cover and bearing on the cover.

Seat 52 has hexagonal flats 146 for wrenching. It has a generally frusto-conical head 148 that axially engages the downstream exit end of tube 34. A threaded shank 149 threads into complementary threads in the cover. Tube 34 has an interior chamfer 150 that is capable of meeting and contacting frusto-conical head 148. Because this contact ration of the regulator will now be described. As previously brought out, tube 34 seats against valve seat 38 to prevent flow from valve chamber 18 through the tube downstream of the regulator when the pressure downstream is sufficiently high to overcome the tendency of spring 24 and atmospheric pressure to open the regulator by moving the piston and the tube away from seat 38. When the pressure in control chamber 26 drops below some predetermined level, the spring and atmospheric pressure will have their way and the piston and tube will be moved slightly away from the seat to permit flow of fluid through the tube and into necked passage 30. Spring 24 will have been extended somewhat by this movement and the force that it applies on the piston reduced somewhat owing to spring relaxation. The discharge of fluid through the tube and into necked passage 30 overrides this tendency by creating a reduced pressure in the control chamber. As the rate of fluid flow through the tube increases with the tube moving further from seat 38, the aspirating effect will be increased and the continued relaxation of the spring compensated. When the pressure in exit port 32 becomes the regulated pressure, tube 34 will stop moving. When there is no flow demand, tube 34 will engage the seat, as shown by the right-hand side in FIG. 1, closing the valve chamber to the control chamber and exit ports.

As brought out previously, to use the regulator in the charging circuit one merely threads an appropriate fitting into fitting 114 and charges through check valve 116.

The present invention has been described with reference to a predetermined embodiment. The spirit and scope of the appended claims should not, however, necessarily be limited to the foregoing description.

What is claimed is:

1. An improved regulator comprising:
   (a) a body having at least one entrance passage for admitting a fluid, a bore opening into the passage, at least one exit passage for the passage of fluid from the body and spaced from the entrance passage, and seating means in the entrance passage in line with the bore, the seating means including an elastomeric element against which the tube seats and a plug removably mounted to the body, the elastomeric element being mounted in the plug, the exit passage including a control chamber, a necked passage and an exit port,
   (b) a tube in the bore and having an entrance in communication with the entrance passage and an exit in communication with the exit passage, the tube seating against the elastic element, the tube entrance having an interior chamfer to its outside diameter to present an annular edge for seating on the seating means and when seated no area subject to entrance passage pressure normal to the line of movement of the tube, the plug having a vent to atmosphere from the side of the elastomeric element opposite the tube;
   (c) a control element secured to the tube and movable with the tube, the element having an exit pressure side subject to pressure in the exit passage and an opposition side, the control chamber being adjacent to and facing the control element such that pressure in the control chamber urges against the control element, the necked passage opening into the control chamber and having a width less than the width of the control chamber, the exit port opening into the necked passage and the outside of the regulator, the exit end of the tube being in the necked passage such that the fluid discharging therefrom aspirates fluid from the control chamber to lower the pressure there,
   (d) biasing means acting between the body and the opposition side of the control element in opposition to pressure in the exit passage, the biasing means includes a piston acting on the control element;
   (e) means sealing the exit pressure side of the control element from the opposition side; and
   (f) an exit seat at the exit end of the tube and mounted to the body, the exit seat being positioned to substantially close the tube when the tube moves against it in response to some pressure in the exit passage below some predetermined pressure and corresponding to a loss of pressure downstream of the regulator, exit seat permitting a minute leak of fluid into the exit passage from the tube when the tube is against it.

2. An improved fluid pressure regulator comprising:
   (a) a body of a chambered section and a cover attached to the chambered section;
   (b) the chambered section having a valve chamber, a plurality of identical inlet ports opening into the valve chamber, a spring chamber an axial bore extending from the valve chamber to the spring chamber, and a valve seat opposite the bore and aligned with it, each inlet port being adapted to receive a standard fitting, and at least one of the inlet ports having a caheck valve in it to permit flow through the port in the direction of the valve chamber and the use of the regulator in a charging circuit, the spring chamber being vented to atmosphere;
   (c) the cover having a control chamber facing the spring chamber and at least one exit port, and a necked passage connecting the control chamber and the exit port;
   (d) a control piston and tube, the tube being secured to the control piston and extending through the bore of the body between the valve chamber and the necked passage, the tube and piston being secured together, the piston facing the control chamber at one end and facing the spring chamber at an opposite end, the tube being aligned with the valve seat and seating on the seat when the pressure in the control chamber exceeds some predetermined value, the tube having no net area against which pressure in the valve chamber can act and urge the tube to move, the tube exiting in the necked passage so that fluid emanating from the tube aspirates fluid from the control chamber;
   (e) a spring in the spring chamber acting between the body and the piston in a direction tending to move the piston and tube away from the valve chamber;
   (f) a diaphragm between the control chamber and the spring chamber and attached to the piston to separate the two chambers;
   (g) a plug removably mounted on the chambered section adapted to be received in the bore in alignment with the tube, a recess in the chambered section for the plug axially aligned with the tube, the valve seat being received in the recess, and a relief in the chambered section from the recess to atmosphere on the low pressure side of the seat; and
   (h) an exit seat in the exit port and mounted to the cover, the exit seat being adapted to be engaged by the tube in a position of the latter corresponding to a downstream pressure lower than some predetermined regulated value, the exit seat and tube permitting a minute leak into the exit port when the two are in engagement.

3. The improved fluid pressure regulator claimed in claim 2 wherein the spring chamber is between the control chamber and the valve chamber and the tube passes through the spring chamber, and including seal means between the tube and the body to prevent leakage from the valve chamber to the spring chamber, and means defining a vent from the spring chamber to atmosphere.

4. An improved fluid pressure regulator comprising:
(a) a body of a chambered section and a cover attached to the chambered section;
(b) the chambered section having a valve chamber, a plurality of identical inlet ports opening into the valve chamber, a spring chamber, an axial bore extending from the valve chamber to the spring chamber, and a valve seat opposite the boer and aligned with it, each inlet port being adapted to receive a standard fitting, and at least one of the inlet ports having a check valve in it to permit flow through the port in the direction of the valve chamber and the use of the regulator in a charging circuit, the spring chamber being vented to atmosphere;
(c) the cover having a control chamber facing the spring chamber and at least one exit port, the cover also having a necked passage connecting the control chamber and the exit port;
(d) a control piston and tube, the tube being secured to the control piston and extending through the bore of the body between the valve chamber and the necked passage, the tube and the piston being secured together, the piston facing the control chamber at one end and facing the spring chamber at an opposite end, the tube being aligned with the valve seat and seating on the seat when the pressure in the control chamber exceeds some predetermined value, the tube having no net area against which pressure in the valve chamber can act and urge the tube to move, the tube exiting in the necked passage so that fluid emanating from the tube aspirates fluid from the control chamber;
(e) a spring in the spring chamber acting between the body and the piston in a direction tending to move the piston and tube away from the valve chamber; and
(f) a diaphragm between the control chamber and the spring chamber and attached to the piston to separate the two chambers;
(g) the spring chamber being between the control chamber and the valve chamber and the tube passing through the spring chamber,
(h) seal means between the tube and the body to prevent leakage from the valve chamber to the spring chamber,
(i) means defining a vent from the spring chamber to atmosphere; and
(j) an exit seat in the exit port and mounted to the cover, the exit seat being adapted to be engaged by the tube in a position of the latter corresponding to a downstream pressure lower than some predetermined regulated value, the exit seat and tube permitting a minute leak into the exit port when the two are in engagement.

5. The improved regulator claimed in claim 4 wherein the tube has an interior chamfer at its inlet end substantially completely out to the outer diameter of the tube at its entrance to eliminate displacement forces on the tube by supply side pressure when the tube is against the seat.

6. The improved regulator claimed in claim 4 wherein the tube has an interior chamfer at its inlet end substantially completely out to the outer diameter of the tube at its entrance to eliminate displacement forces on the tube by supply side pressure when the tube is against the seat.

* * * * *

UNITED STATES PATENT AND TRADEMARK OFFICE
CERTIFICATE OF CORRECTION

PATENT NO. : 4,467,828

DATED : August 28, 1984

INVENTOR(S) : Donald R. Gneiding

It is certified that error appears in the above-identified patent and that said Letters Patent is hereby corrected as shown below:

Col. 4, line 3, for "plane" read -- plan --.

Col. 5, line 57, for "square" read -- spare --.

Col. 6, line 57, for "contact ration" read:
-- contact is metal-to-metal, there will be a slight leak. The leak permits re-pressurization of the downstream side of the regulator and control chamber 26. With re-pressurization of the control chamber, tube 34 lifts off seat 52.
    -- The detailed operation --.

Col. 7, line 21, for "predetermined" read -- preferred --.

Signed and Sealed this

Thirty-first Day of March, 1987

Attest:

DONALD J. QUIGG

Attesting Officer  Commissioner of Patents and Trademarks